United States Patent
Walker et al.

(10) Patent No.: US 7,830,833 B2
(45) Date of Patent: Nov. 9, 2010

(54) METHOD AND APPARATUS FOR RANKING OF MEDIA SERVICES AND PROGRAM PACKAGES

(75) Inventors: Gordon Kent Walker, Poway, CA (US); An Chen, San Diego, CA (US); Sajith Balraj, San Diego, CA (US); Bruce Collins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1157 days.

(21) Appl. No.: 11/120,512

(22) Filed: May 2, 2005

(65) Prior Publication Data

US 2005/0276246 A1 Dec. 15, 2005

Related U.S. Application Data (60) Provisional application No. 60/568,325, filed on May 4, 2004, provisional application No. 60/625,637, filed on Nov. 4, 2004.

(51) Int. Cl.
*H04W 4/00* (2009.01)
(52) U.S. Cl. .................. 370/329; 370/342
(58) Field of Classification Search .............. 370/342, 370/347; 455/403, 414.1, 566; 725/36
See application file for complete search history.

(56) References Cited

U.S. PATENT DOCUMENTS

| | | | |
|---|---|---|---|
| 6,526,575 B1* | 2/2003 | McCoy et al. | 725/36 |
| 2002/0115437 A1* | 8/2002 | Fukui et al. | 455/435 |
| 2002/0138619 A1* | 9/2002 | Ramaley et al. | 709/226 |
| 2003/0016174 A1* | 1/2003 | Anderson | 342/378 |
| 2003/0236700 A1 | 12/2003 | Arning et al. | 705/11 |
| 2004/0003413 A1 | 1/2004 | Boston et al. | 725/133 |
| 2004/0083492 A1* | 4/2004 | Goode et al. | 725/87 |
| 2004/0193695 A1* | 9/2004 | Salo et al. | 709/216 |
| 2004/0237104 A1* | 11/2004 | Cooper et al. | 725/38 |
| 2005/0090235 A1* | 4/2005 | Vermola et al. | 455/414.3 |

FOREIGN PATENT DOCUMENTS

| | | |
|---|---|---|
| CL | 1040-2005 | 12/2005 |
| CL | 1043-2005 | 12/2005 |

(Continued)

OTHER PUBLICATIONS

International Search Report—PCT/US05/015455, International Search Authority—European Patent Offic Aug. 11, 2005.
Written Opinion—PCT/US05/015455, International Search Authority—European Patent Office, Aug. 11, 2005.

(Continued)

*Primary Examiner*—Chirag G Shah
*Assistant Examiner*—Minh-Trang Nguyen
(74) *Attorney, Agent, or Firm*—Milan Patel; Gerald P. Joyce, III (57) ABSTRACT

A method for improved presentation of media information for wireless communication is described herein. Media services and program packages are ranked and ranking information is delivered to a mobile device along with the media information. The ranking information is then used by the mobile device to arrange the media services in a ranked order. The ranking information can also be used to assign a default service that is displayed whenever the mobile device is activated or whenever a selection is made to view media content. The ranking information can also be used to arrange program packages in a ranked order for subscription purposes.

26 Claims, 4 Drawing Sheets

FOREIGN PATENT DOCUMENTS

| | | |
|---|---|---|
| CL | 1047-2005 | 12/2005 |
| CL | 1046-2005 | 1/2006 |
| EP | 1193976 A2 | 9/2001 |
| WO | WO 01/57850 A2 | 8/2001 |

OTHER PUBLICATIONS

International Preliminary Report on Patentability—PCT/US05/015455, The International Bureau of WIPO Switzeland, Nov. 16, 2006.

* cited by examiner

METHOD AND APPARATUS FOR RANKING OF MEDIA SERVICES AND PROGRAM PACKAGES

The present Application for Patent claims priority to Provisional Application No. 60/568,325 entitled "Method and Means to Support Default Services, Service and Package Ranking, and Replacement Services with Multiple Service Retailers" filed May 4, 2004, and Provisional Application No. 60/625,637 entitled "Method and Means to Support Default Services, Service and Package Ranking, and Replacement Services with Multiple Service Retailers" filed Nov. 4, 2004, assigned to the assignee hereof and hereby expressly incorporated by reference herein.

BACKGROUND

1. Field

This invention relates to a method, apparatus and systems for distributing multimedia content to a mobile device.

2. Background

Second generation (2G) networks include Code Division Multiple Access (CDMA) and Global System for Mobile Communications (GSM) networks and provide a wireless connection for digital voice encoding. Third Generation (3G) mobile networks offer cellular data rates that approach a wired broadband connection. These 3G mobile networks are robust delivery mechanisms for a rich variety of services that are being offered around the world. From CDMA 2000-based networks to those based on WCDMA (Wide-band Code-Division Multiple Access), cellular users are able to access services and information that were once only available from a wired desktop computer. Using third generation technologies it is now possible to deliver applications and multimedia services, such as streaming video files and interactive television programming, to these mobile devices.

WCDMA is also referred to as Universal Mobile Telecommunications System (UMTS) and along with CDMA 2000 represent an evolution in terms of services and data speeds from today's 2G mobile networks. UMTS and CDMA 2000 third generation mobile technologies identified by the ITU (International Telecommunication Union) are expected to include capabilities and features such as: enhanced multimedia (voice, data, video, and remote control), usability on all popular modes (cellular telephone, e-mail, paging, fax, videoconferencing, and Web browsing), broad bandwidth and high speed (upwards of 2 Mbps) routing flexibility (repeater, satellite, LAN), operation at approximately 2 GHz frequencies, and roaming capability throughout Europe, Japan, and North America.

Today's mobile customers have already demonstrated a desire for "non-voice" and other new services. More than 24 billion text messages are sent every month, and now customers are choosing Multimedia Messaging Service (MMS), an evolution of text messaging that adds pictures and sound elements. CDMA 2000 and UMTS will build on these first steps towards a mobile multimedia future, allowing operators to offer new services to consumers.

The availability of these robust mobile networks and sophisticated handheld devices, coupled with increasing consumer demand for media content, has generated a need for improved methods to present media services to a subscriber in a manner that takes into account marketing strategies.

SUMMARY

A media distribution method and apparatus is described for ranking media services and program packages. The ranking of media services allows the display of video and audio programming services on a mobile device in accordance with the ranked media services. For instance, program packages that contain multiple services will have the services ranked in a particular order and one of the services can function as a default service for that program package. When a user turns on the mobile device or accesses the media services, the user will be presented with the default service of the program package to which she is subscribed. The default service can be the highest ranked service for each program package. Thus, service and content providers can control what media service the user is first presented and the order in which media information is displayed to the user.

DETAILED DESCRIPTION

A method and apparatus for ranking media services (services) and program packages (packages) and for defining default services or packages for improved control of the presentation of media information to the user are described. Ranking services and packages and defining default services based on those rankings allows the service and content providers to determine what information the user sees first and in what order the information is presented to the user. There is commercial value in controlling the order in which media information is presented to the user and the disclosed method capitalizes on this commercial value. In one example, media services and packages are received at a mobile device operating in a wireless communications environment.

Figure 1:
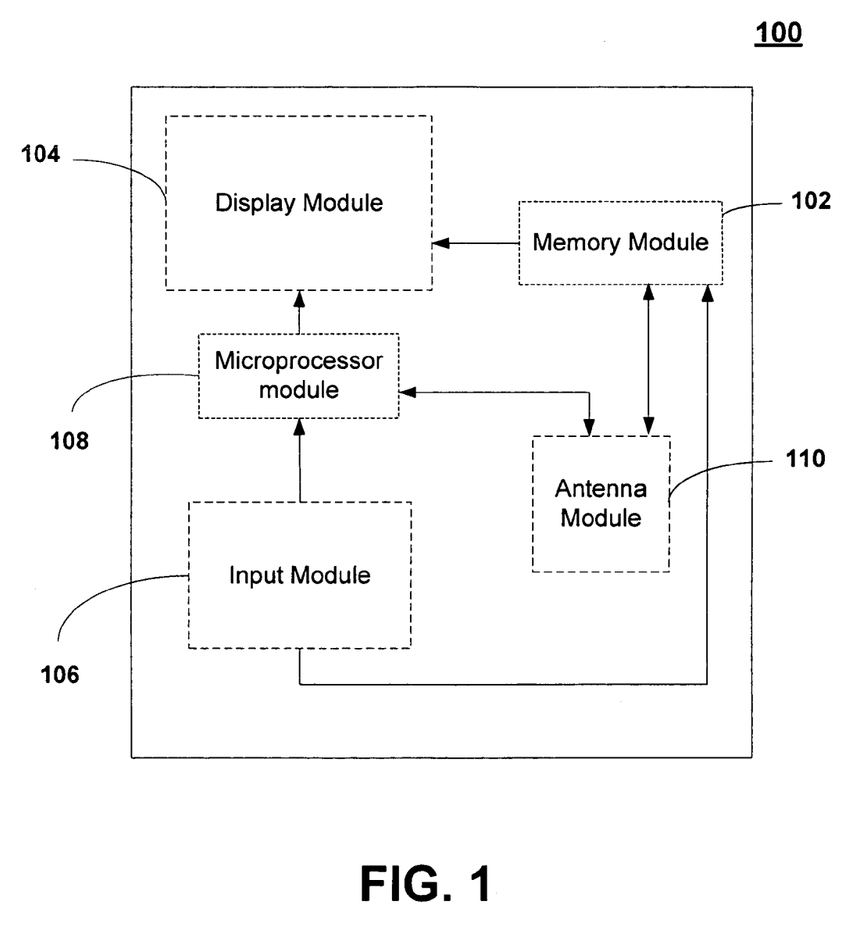
FIG. 1 is an illustration of one example of a mobile device for a wireless network.

FIG. 1 is an illustration of one example of a mobile device for a wireless network. The mobile device 100 includes a memory module 102, a display module 104, an input module 106 such as, for example, an alphanumeric key arrangement or a joystick, at least one microprocessor 108, and antenna module 110. The input module 106 allows a subscriber to interact with the mobile device 100. The antenna module 110 can send and receive wireless information. In this example, when a user turns on the mobile device 100 or selects the option of viewing media content from on an screen menu of the mobile device 100, the microprocessor module 108 using a set of instructions, such as a software application loaded onto the memory module 102, displays media information using display module 104 in accordance with assigned rankings delivered to the mobile device. The ranking information could also be generated at the mobile device based on a set of instructions delivered to the mobile device. The present method can be practiced on such mobile devices as, for example, a PDA, a cell phone or a personal media player. Additional details about implementing the present method on the mobile device 100 are provided below.

It should be understood that media information includes such things as media services, media packages, a program guide, and media content. Media content refers to a media presentation such as a media program or advertising. A media service refers to a sequence of media presentations. Media services include such things as television and cable networks, a set of advertisements, pay per view events, etc. A package, such as a program or media package, refers to a collection of one or more media services. A default service refers to the service displayed on the users mobile device when the user has made no explicit selection of services. The default service could be, for example, a television network feed or stored video information that is automatically displayed with display module 104. The default service could also be a program guide that is organized in accordance with the ranking information determined by the service provider, or it could be a service that is automatically displayed in a preview window. Default services can be visible to the user or they can be invisible services. Invisible services are not displayed with display module 104, but can be utilized for delivery of advertisements to the mobile device 100.

Figure 2:
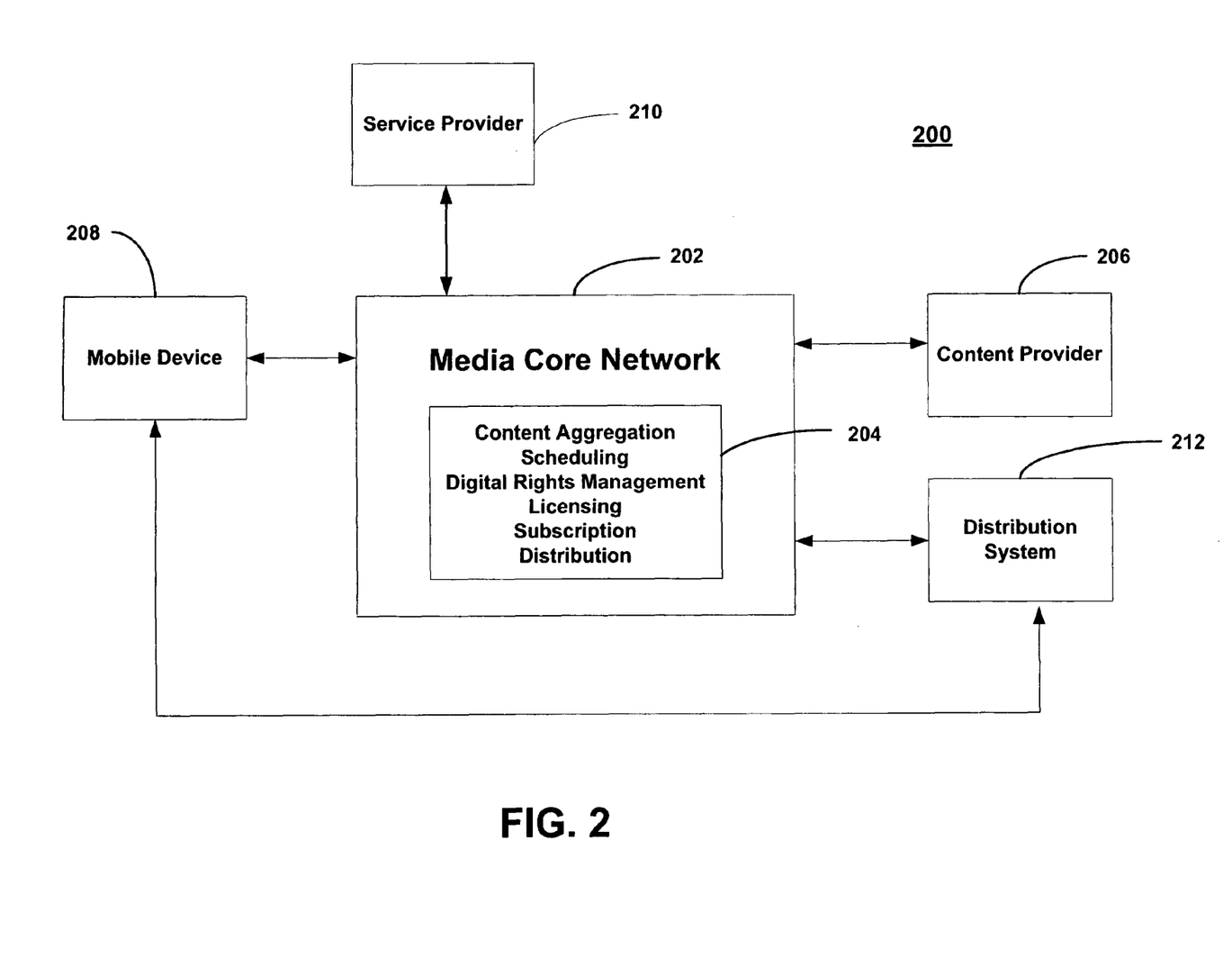
FIG. 2 is a block diagram of one example of a media distribution system that can be used to provide an improved subscription method.

FIG. 2 is a block diagram of one example of a media distribution system that can be used to provide a ranking scheme. The media distribution system 200 includes a media core network 202, at least one content provider 206, a mobile device 208, a service provider 210, and a distribution system 212. The media core network 202 contains server components 204 that collectively provide media content aggregation from the various content providers 206, scheduling of the media, managing the digital rights of the media content along with the licensing, subscription and media distribution. The distribution system 212 manages this transfer, i.e., to the content provider 206, the mobile device 208 and the service provider (retail provider) 210. The distribution system 212 also distributes software applications to the mobile device 208 as well as manages billing and other accounting requirements. The media core network 202 sends media information to a mobile device 208, along with associated programming information, based on a delivery schedule.

In this example, the media distribution system 200 is a wireless communications system. By way of a specific example, the embodiment is discussed in relation to a CDMA communication system. The principles of CDMA communication systems, and in particular the general principles for generation of spread spectrum signals for transmission over a communication channel are known to one of ordinary skill in the art. For any wireless communication system described or referred to, it is to be understood that it refers both to the digital signal technology as well as the network for carrying the signal. Instead of CDMA, the wireless network can be a frequency division multiple access (FDMA) system, a time division multiple access (TDMA) system such as GSM, GSM/GPRS (General Packet Radio Service), EDGE (Enhanced Data GSM Environment) or TETRA (Terrestrial Trunked Radio, a mobile telephone technology for the service industry), WCDMA or other high data rate (1×EV-DO or 1×EV-DO Gold Multicast) systems, or in general any wireless communication system.

A service provider 210 operates the media distribution system 200 and controls delivery of the services offered by the content providers 206. The media core network 202 provides services grouped in the form of program packages to a subscriber's mobile device 208. The media core network 202 provides an interface for the service provider 210 to create and define the program packages and services and their rankings. The services offered by the content providers 206 can be configured by service providers 210 using server components 204 of the media core network 202 into ranked program packages and/or ranked media services. The ranked information is delivered to mobile devices 208 via distribution system 212. By ranking packages and services, the service provider 210 can control the first service that will be displayed to the user and the order in which services and service packages will be available to the user. Content providers 206 will pay a premium to obtain higher rankings so as to be more quickly accessible to the users. Service providers can use rankings to promote subscription to specific services or packages.

Each service and each program package is given a value that constitutes a rank. In one example, the rank of a program package is determined by the sum of the values of its grouped service rankings. In another example, the rank of the program package can be adjusted by taking into account other factors, such as perceived consumer value or to promote a new service or a one time sporting event. Additional details about performing the methods in the context of the CDMA media distribution system 200 are discussed below.

Figure 3A:
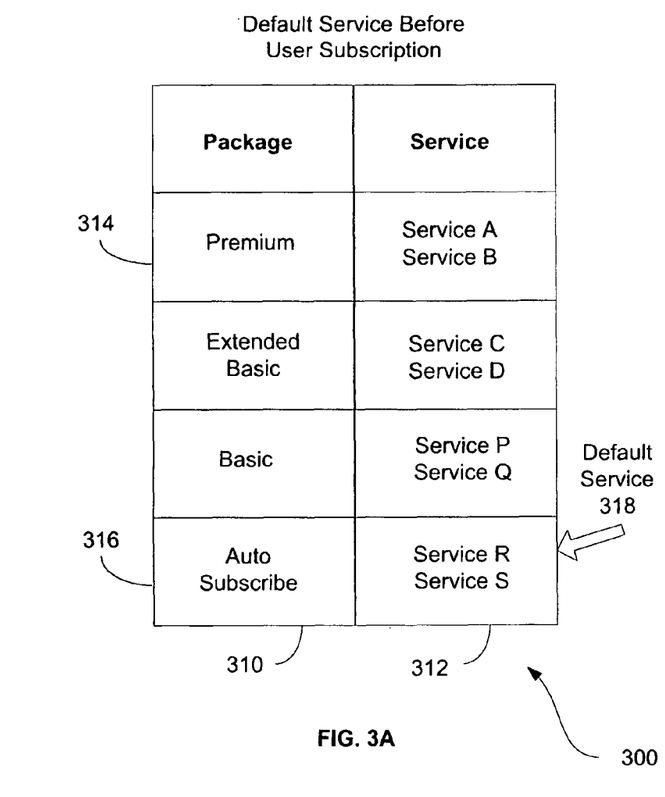
FIGS. 3A and 3B illustrate an example of a relationship between default services and the ranking of services and packages.
Figure 3B:
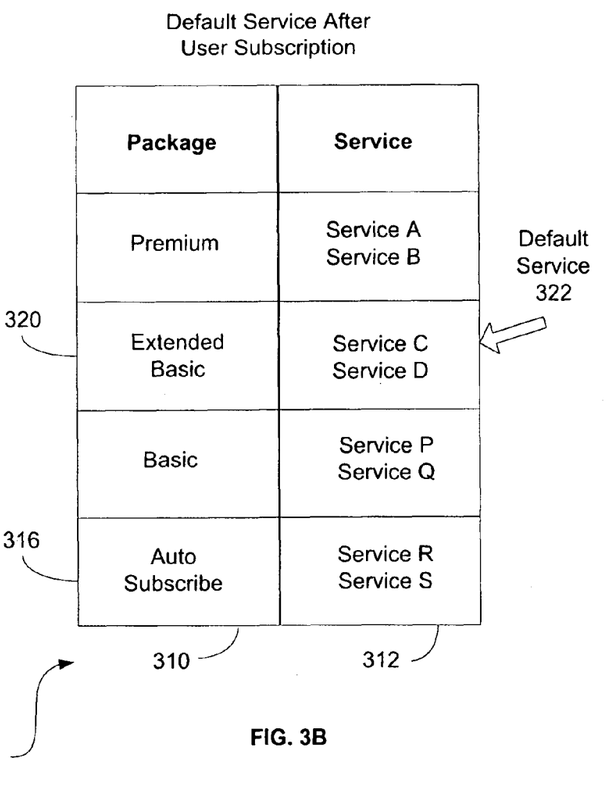

FIGS. 3A and 3B illustrate an example of a relationship between default services and the ranking of services and packages. Table 300 contains a column of ranked packages 310 and a column of ranked services 312. The packages of column 310 are ranked in an order with Premium package 314 having the highest package ranking and Auto-subscribed package 316 having the lowest package ranking. For sake of simplicity, each package in this example is shown containing two services. The services within each package are also ranked, such that Service A, which belongs to the highest ranked package, Premium package 314, is ranked above Service B of the same package. Service A also happens to be the highest ranked service in table 300.

The example in FIG. 3A, shows the default service relationship before the user subscribes to a service package. Before the user subscribes to a service package, the user is automatically subscribed to Auto-subscribe package 316. Auto-subscribe package 316 does not require any user interaction to cause the subscription and contains only limited services with such media content as, for example, service media previews, pay-per-view options or consumer product advertising. As shown in table 300, Service R of Auto-subscribed package 316 is ranked above Service S of the same package. In this example, the highest ranked service that is available to a user at her subscription state is defined as the default service 318. Since the user only has access to the Auto-subscribed package 316, Service R is the default service and will be displayed to the user when the user activates the mobile device or selects to view media content from an on-screen menu. If Services R and S are invisible services, as described above, then Service R will not be displayed to the user but will be utilized by the device for such things as advertisement delivery.

In the example of FIG. 3B, the user is subscribed to Extended Basic package 320. Extended Basic package 320 contains Services C and D, with Service C being the highest ranked service in package 320. In this example, the user's subscription to Extended Basic package 320 allows the user access to Services C, D, P, Q, R, and S. If the default service is defined as the highest ranked service to which a user has access, Service C is the default service 322. Thus, Service C will be automatically displayed when a user that is subscribed to Extended Basic package 320 either activates the mobile device or selects to view media content from an on-screen menu of the mobile device.

When a media program guide is launched at the mobile device, media content from the default service can be automatically displayed in a preview mode. The available services can also be arranged in the displayed media program guide in accordance with the ranked order of services. Thus as the user scrolls through the available services listed in the program guide, the user will be able to see and choose higher ranked services before lower ranked services. In one example, the order of service rankings within a package assigns the highest ranking to the most expensive service and arranges it at the top of the list and the least expensive at the bottom of the list. In another example, the default order can take into account services that are being specially promoted for a limited time, such as, for example, services from a new content provider or an existing content provider promoting specific media such as a new news station or a new sports channel.

If the default service is excluded (cancelled or temporarily blocked), either by the subscriber or a service provider, the next service in the ranking order becomes the default service. For example, a service may be made unavailable at the subscriber's mobile device if the mobile device is physically moved into a blackout area such as for a sports game, i.e., a football game that is locally blacked out. Thus, in the example of FIG. 3B, if Service C was cancelled or blocked, Service D, the next-highest ranked service would become the default service 322. However, some program packages, such as the auto-subscribe package can be non-excludable (non-cancelable) to allow content, such as advertisements, to always be available for display such as in a preview mode or full screen mode on the mobile device.

The ranking scheme can also be used to improve the subscription process. Program packages available for subscription can also be presented to the user according to a ranked order. Thus, the service provider, through determining the rankings of program packages, can control which program packages are more prominently presented to the user. Higher ranked packages may be more easily accessible by the user and thus, the service provider can charge a premium to content providers for designating their service to a higher ranked program package.

Figure 4:
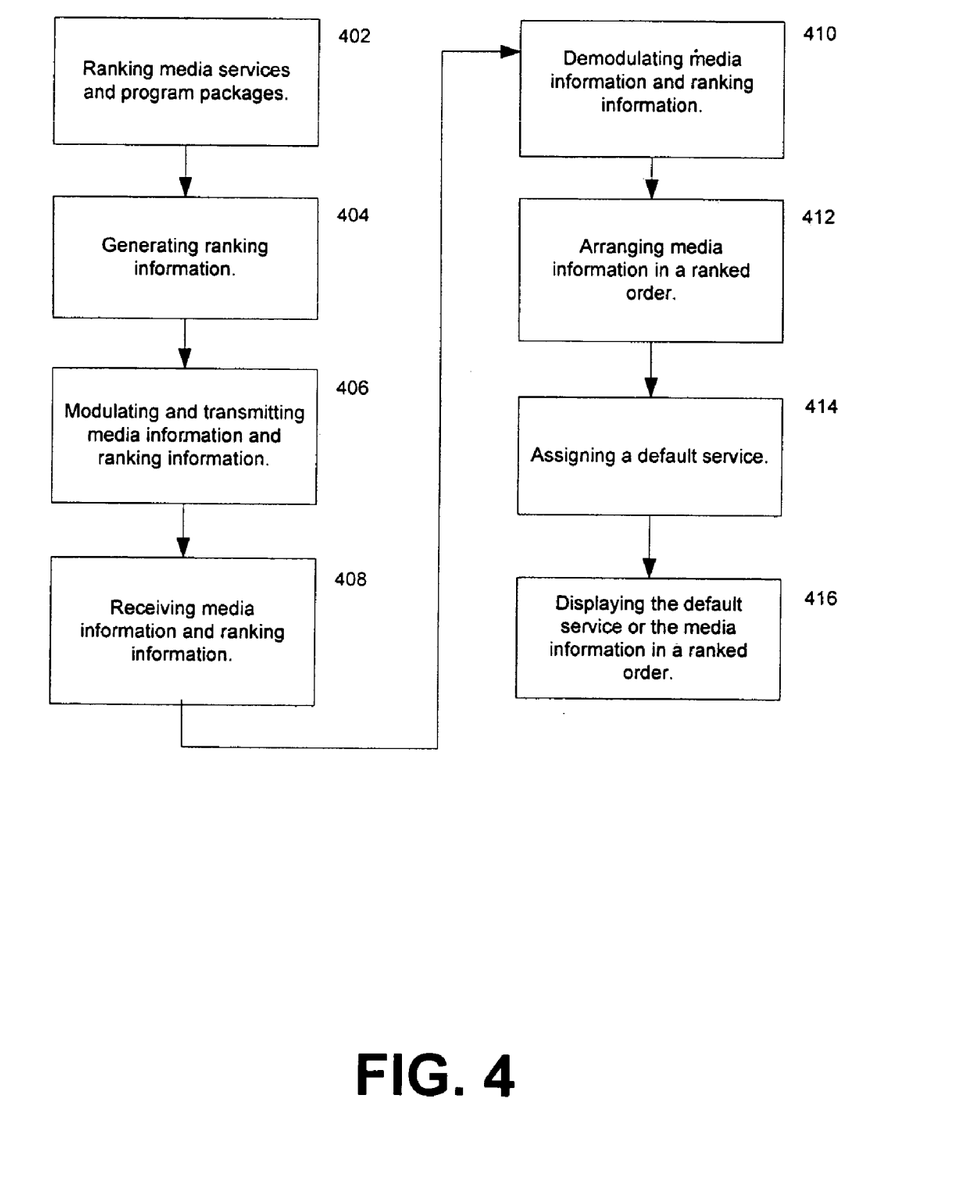
FIG. 4 is a flow diagram illustrating one example of a method for using service rankings and default services for presenting media information.

FIG. 4 is a flow diagram illustrating one example of a method for using service rankings and default services for presenting media information. At step 402, a service provider, using ranking means such as server components 204 of FIG. 2, ranks media services and program packages. As described above, numerous ranking schemes can be used by the service provider to maximize the commercial value of the media services. At step 404, means for generating ranking information such as server components 204 of FIG. 2, generate ranking information. The ranking information can include rankings of media services, program packages, or both.

At step 406, modulating means and transmitting means such as server components 204 and distribution system 212 of FIG. 2 modulate and transmit the ranking information along with the media information. The media information and ranking information is modulated and transmitted to a mobile device according to wireless scheme such as a CDMA network. Other wireless schemes can be used, such as, for example, CDMA, CDMA 2000, GSM, WCDMA, GSM/GPRS/WCDMA, TDMA, TDMA/EDGE and TETRA. The transmitted information can include subscription information that refers to program package ranking information. This subscription information can be used to display available packages for subscription according to an order determined by the service provider. The service provider can also deliver to the mobile device instructions for determining a default service.

At step 408, receiving means such as antenna module 110 of FIG. 1 receives media information and ranking information at the mobile device. At step 410, the media information and ranking information is demodulated by demodulating means such as antenna module 110 along with microprocessor module 108 and memory module 102 of FIG. 1 according the same respective wireless scheme as used by the service provider. At step 412, the mobile device uses the ranking information to arrange the media services or packages for display in the ranked order.

The mobile device may also receive or be loaded with instructions for determining a default service from the media information based on the ranking information. At step 414, the mobile device uses assigning means such as microprocessor module 108 of FIG. 1 to assign a media service from the plurality of media service delivered to the mobile device as the default service. As described above, the default service may be the highest ranked service available to the user based on the current subscription state of the mobile device. The default service can be based on a variety of other factors such as a service provider's efforts to run special promotions. If the default service becomes excluded or suppressed, the mobile device will reassign the default service to a non-excluded, non-suppressed service according to the instructions for determining a default service. The reassigned default service may be the next available highest ranked service.

When the mobile device is activated or when the mobile devise receives an instruction from input module 106 of FIG. 1 to display media content, the mobile device displays the media information in accordance with the ranked order. At step 416, display means such as display module 104 of FIG. 1 displays the default service, or alternatively, the media services in a ranked order. Display module 104 can generate and display a media program guide where the services/programs are listed in the ranked order. The default service is the first service/program listed in the program guide and can also be displayed in preview window within the program guide. Alternatively, display module 104 can display the default service in a full screen directly without presenting a program guide in response to request to view media content. The program guide can include all ranked services or only those available to the mobile device based on the current subscription state. The mobile device can also use the ranking information to enhance subscription functionality by presenting subscription options to the user in a ranked order according to the service provider's preferences.

It should be realized that there is no limit to the number of content provider networks that can used to provide services that are grouped into packages. Ranks may not be determined using a uniform method, that is, ranks for services from different content providers may be determined using different factors and/or algorithms. Weighted factors can be used to determine ranks for some services or for all services. If weighted factors are used, these factors can be determined by the service provider alone or through negotiations with each of the content providers individually or in concert. The priority position may be the highest position displayed in the media program guide.

It is to be appreciated that any grouping of media is possible. In one example, individual programs can be grouped into a service, multiple services can be grouped into a tier, a program package can be a bundling of services and/or tiers, a tree can be bundled groups of packages, etc. The mobile device can display a set of program packages available for subscription in ranked order. The services grouped within each program package can be displayed along side their respective program package or not displayed until a program package is selected. The grouped services are displayed in a ranked order. Individual services not grouped within a program package, such as, for example, pay-per-view, can be displayed with the grouped services. An order for displaying the individual services with the grouped services can also be determined through the ranking process.

A mobile device can have subscription information, i.e., media support data such as package ranking, service ranking and default information, initially installed by the original equipment manufacturer (OEM). The mobile device can also have subscription transferred to the mobile device through wireless communication at a later date.

Those of skill in the art would understand that information and signals are represented using a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above. Whether such structures are implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with one or more general purpose processors, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC) and the ASIC may reside in a wireless modem or the processor and the storage medium may reside as discrete components in the wireless modem.

The previous descriptions of examples are provided to enable any person skilled in the art to make or use the disclosed examples. Various modifications to these examples will be readily apparent to those skilled in the art, and the principles defined herein may be applied to other examples without departing from the spirit or scope of the disclosed methods.

It is to be noted that the disclosed methods can be used with any form of content that content providers care to generate. Displaying program packages and/or services in an order, or assigning default services, or providing a program package or service as visible or invisible, excludable or non-excludable, may be accomplished in any manner consistent with the decisions of the content providers and/or service provider. Therefore, the disclosed methods are not intended to be limited to the examples shown herein but is to be accorded the widest scope consistent with the principles and novel features disclosed herein.

Aspects of the disclosed examples include, but are not limited to, the descriptions below.

A method of presenting media information for wireless communication that includes receiving media information, receiving ranking information associated with the media information, demodulating the received information according to a wireless scheme, and displaying the media information in accordance with the ranking information.

An electronic device for wireless communication that is configured to receive media information, receive ranking information associated with the media information, demodulate the received information according to a wireless scheme, and display the media information in accordance with the ranking information.

An apparatus for presenting media information for wireless communication that includes, means for receiving media information, means for receiving ranking information associated with the media information, means for demodulating the received information according to a wireless scheme, and means for displaying the media information in accordance with the ranking information.

A computer-readable medium embodying means for causing a wireless mobile device to execute a method that includes receiving media information, receiving ranking information associated with the media information, demodulating the received information according to a wireless scheme, arranging media services from the received media information in a ranked order in accordance with the ranking information, assigning a media service from the received media information as a default service based on the ranking information, and displaying the media information in accordance with the ranking information.

A method for delivering media content for wireless communication that includes ranking media services, generating ranking information based on the media service rankings, modulating media information and the ranking information according to a wireless scheme, and transmitting the modulated information to a mobile device.

An electronic device for wireless communication that is configured to rank media services, generate ranking information based on the media service rankings, modulate media information and the ranking information according to a wireless scheme, and transmit the modulated information to a mobile device.

An apparatus for delivering media information for wireless communication that includes means for ranking media services, means for generating ranking information based on the media service rankings, means for modulating media information and the ranking information according to a wireless scheme, and means for transmitting the modulated information to a mobile device.

A computer-readable medium embodying means for causing a wireless mobile device to execute a method that includes ranking media services, generating ranking information based on the media service rankings, grouping media services into program packages, ranking the program packages, generating ranking information that includes the rankings of program packages, modulating media information and the ranking information according to a wireless scheme, and transmitting to a mobile device the modulated information and a set of instructions for determining a default service.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. A method of presenting media services on a wireless device, comprising:
    receiving media information describing available media services;
    receiving ranking information associated with the media information, wherein said ranking information represents a relative indicator of a value to a service provider of the available media services;
    demodulating the received information according to a wireless scheme;
    determining a default service based on the ranking information and a current subscription state of the wireless device, wherein the default service represents a highest ranked one of the media services; and
    displaying the default service when a user of the wireless device has not made an explicit selection of a media service.

2. The method of claim 1, wherein said displaying further comprises:
    displaying a program guide having media services organized in accordance with ranking information.

3. The method of claim 1, further comprising:
    receiving subscription information describing media services available for subscription by the wireless device;
    receiving ranking information associated with the subscription; and
    displaying the subscription information in a ranked order in accordance with the ranking information.

4. The method of claim 1, further comprising:
    determining a substitute default service based on the ranking information and the current subscription state of the wireless device if the default service becomes unavailable, wherein the substitute default service represents a next highest ranked one of the media services.

5. The method of claim 1, wherein the ranking information comprises a rank value for each one of the media services, and wherein the rank value is based on weighted factors.

6. An electronic device for wireless communication, the electronic device configured to:
    receive media information describing available media services;
    receive ranking information associated with the media information, wherein said ranking information represents a relative indicator of a value to a service provider of the available media services;
    demodulate the received information according to a wireless scheme;
    determine a default service based on the ranking information and a current subscription state of the electronic device, wherein the default service represents a highest ranked one of the media services; and
    display the default service when a user of the electronic device has not made an explicit selection of a media service.

7. The electronic device of claim 6, further configured to display a program guide having media services organized in accordance with ranking information.

8. The electronic device of claim 6, further configured to receive subscription information describing media services available for subscription by the electronic device, receive ranking information associated with the subscription information, and display the subscription information in a ranked order in accordance with the ranking information.

9. The electronic device of claim 6, further configured to determine a substitute default service based on the ranking information and the current subscription state of the wireless device if the default service becomes unavailable, wherein the substitute default service represents a next highest ranked one of the media services.

10. The electronic device of claim 6, wherein the ranking information comprises a rank value for each one of the media services, and wherein the rank value is based on weighted factors.

11. A wireless apparatus for presenting media information, comprising:
    means for receiving media information describing media services;
    means for receiving ranking information associated with the media information, wherein said ranking information represents a relative indicator of a value to a service provider of the available media services;

means for demodulating the received information according to a wireless scheme;

determining a default service based on the ranking information and a current subscription state of the wireless device, wherein the default service represents a highest ranked one of the media services; and means for displaying the default service when a user of the wireless apparatus has not made an explicit selection of a media service.

12. The apparatus of claim 11, wherein said means for displaying further comprises:

means for displaying a program guide having media services organized in accordance with ranking information.

13. The apparatus of claim 11, further comprising:

means for receiving subscription information describing media services available for subscription by the wireless device;

means for receiving ranking information associated with the subscription information; and means for displaying the subscription information in a ranked order in accordance with the ranking information.

14. The apparatus of claim 11, further comprising:

means for determining a substitute default service based on the ranking information and the current subscription state of the wireless device if the default service becomes unavailable, wherein the substitute default service represents a next highest ranked one of the media services.

15. The apparatus of claim 11, wherein the ranking information comprises a rank value for each one of the media services, and wherein the rank value is based on weighted factors.

16. A computer product comprising:

non-transitory computer-readable medium comprising:

at least one instruction for causing a wireless device to receive media information describing available media services;

at least one instruction for causing the wireless device to receive ranking information associated with the media information, wherein said ranking information represents a relative indicator of a value to a service provider of the available media services;

at least one instruction for causing the wireless device to demodulate the received information according to a wireless scheme;

at least one instruction for causing the wireless device to identify a media service from the received media information as a default service based on the ranking information and a current subscription state of the wireless device, wherein the default service represents a highest ranked one of the media services; and at least one instruction for causing the wireless device to display the default service when a user of the wireless device has not made an explicit selection of a media service.

17. The computer product of claim 16, wherein said at least one instruction for causing the wireless device to display the default service comprises:

at least one instruction for causing the wireless device to display a program guide having media services organized in accordance with the ranking information.

18. The computer product of claim 16, further comprising:

at least one instruction for causing the wireless device to receive subscription information describing media services available for subscription by the wireless device;

at least one instruction for causing the wireless device to receive ranking information associated with the subscription information; and at least one instruction for causing the wireless device to display the subscription information in a ranked order in accordance with the ranking information.

19. The computer product of claim 16, further comprising:

at least one instruction for causing the wireless device to determine a substitute default service based on the ranking information and the current subscription state of the wireless device if the default service becomes unavailable, wherein the substitute default service represents a next highest ranked one of the media services.

20. The computer product of claim 16, wherein the ranking information comprises a rank value for each one of the media services, and wherein the rank value is based on weighted factors.

21. A method of presenting media information for wireless communication, comprising:

receiving ranking information associated with media services displayable by a wireless mobile device, wherein said ranking information represents a relative indicator of a value to a service provider of the available media services;

demodulating the received information according to a wireless scheme;

determining a default media service based on the ranking information and a current subscription state of the wireless mobile device, wherein the default media service represents a highest ranked one of the media services;

displaying a media program guide listing the media services in an order based on the received information, the media program guide including a preview that, at least initially, corresponds to the default media service.

22. The method of claim 21, wherein the displaying the media program guide is conditioned upon a user requesting the media program guide.

23. The method of claim 21 wherein the ranking information is based on a cost to a user of the media service.

24. The method of claim 21 wherein the ranking information is based on a perceived value of a media service to the user.

25. The method of claim 21, further comprising:

determining a substitute default service based on the ranking information and the current subscription state of the wireless device if the default service becomes unavailable, wherein the substitute default service represents a next highest ranked one of the media services.

26. The method of claim 21, wherein the ranking information comprises a rank value for each one of the media services, and wherein the rank value is based on weighted factors.

* * * * *